(12) United States Patent
Bock et al.

(10) Patent No.: US 8,159,681 B2
(45) Date of Patent: Apr. 17, 2012

(54) MEASURING DEVICE FOR DETERMINING THE RELATIVE OFFSET BETWEEN TWO COMPONENTS

(75) Inventors: Gerhard Bock, Trostberg (DE);
Michael Hermann, Tacherting (DE);
Wolfgang Holzapfel, Obing (DE);
Karsten Saendig, Palling (DE);
Johannes Trautner, Traunwalchen (DE)

(73) Assignee: Dr. Johannes Heidenhain GmbH, Traunreut (DE)

( * ) Notice: Subject to any disclaimer, the term of this patent is extended or adjusted under 35 U.S.C. 154(b) by 761 days.

(21) Appl. No.: 11/800,893

(22) Filed: May 7, 2007

(65) Prior Publication Data
US 2007/0273893 A1   Nov. 29, 2007

(30) Foreign Application Priority Data

May 5, 2006   (DE) .......................... 10 2006 021 338
Apr. 24, 2007   (DE) .......................... 10 2007 019 592

(51) Int. Cl.
*G01B 3/30*   (2006.01)
(52) U.S. Cl. ......................................... 356/614; 73/1.79
(58) Field of Classification Search .................. 356/614
See application file for complete search history.

(56) References Cited

U.S. PATENT DOCUMENTS

| | | | |
|---|---|---|---|
| 4,229,883 A * | 10/1980 | Kobashi | 33/784 |
| 4,288,925 A * | 9/1981 | McMurtry | 33/561 |
| 4,658,510 A * | 4/1987 | Zanier | 33/549 |
| 5,077,905 A | 1/1992 | Murray | |
| 5,302,820 A | 4/1994 | Henshaw et al. | |
| 5,767,380 A * | 6/1998 | Haas | 73/1.79 |
| 6,293,680 B1 | 9/2001 | Bruns | |
| 7,095,333 B2 * | 8/2006 | Graff | 340/815.4 |
| 7,121,013 B2 | 10/2006 | Herkt et al. | |
| 7,375,361 B2 * | 5/2008 | Turner et al. | 250/559.3 |

(Continued)

FOREIGN PATENT DOCUMENTS

EP   0 438 664   7/1991

(Continued)

OTHER PUBLICATIONS

Mast, T. S., et al., "Segmented Mirror Control System Hardware for CELT," Active Hardware—SPIE 2000, retrieved from URL:http://wwwastro.caltech.edu/mirror/celt/reports/report00_6 on May 8, 2000.
Search Report, European Patent Application No. 07 00 8380, dated Jul. 16, 2007 (translated).

*Primary Examiner* — Gregory J Toatley
*Assistant Examiner* — Rebecca C Slomski
(74) *Attorney, Agent, or Firm* — Kenyon & Kenyon LLP

(57) ABSTRACT

A measuring device for determining the relative offset between two components in a z-direction includes two measuring members. A first measuring member is affixable on a first component, and the second measuring member is affixable on a second component. Furthermore, the measuring device includes a sensor device for determining the relative position of the two measuring members. The first measuring member and the second measuring member are affixable on the first components at a rigid angle. At least one of the measuring members is able to be brought into adhesive contact with the first component or the second component. The measuring device includes support members for at least one measuring member so that the measuring member is able to assume a parking or an operating position. The measuring members are precisely and reproducibly aligned in space relative to each other in the parking position.

26 Claims, 9 Drawing Sheets

U.S. PATENT DOCUMENTS

2001/0042395 A1* 11/2001 McMurtry ...................... 73/1.79
2004/0246499 A1* 12/2004 Mies ............................. 356/614
2006/0097733 A1   5/2006 Roziere

FOREIGN PATENT DOCUMENTS

EP          1 379 832        1/2004
FR          2 844 048        3/2004
WO     WO 2004/020953        3/2004

* cited by examiner

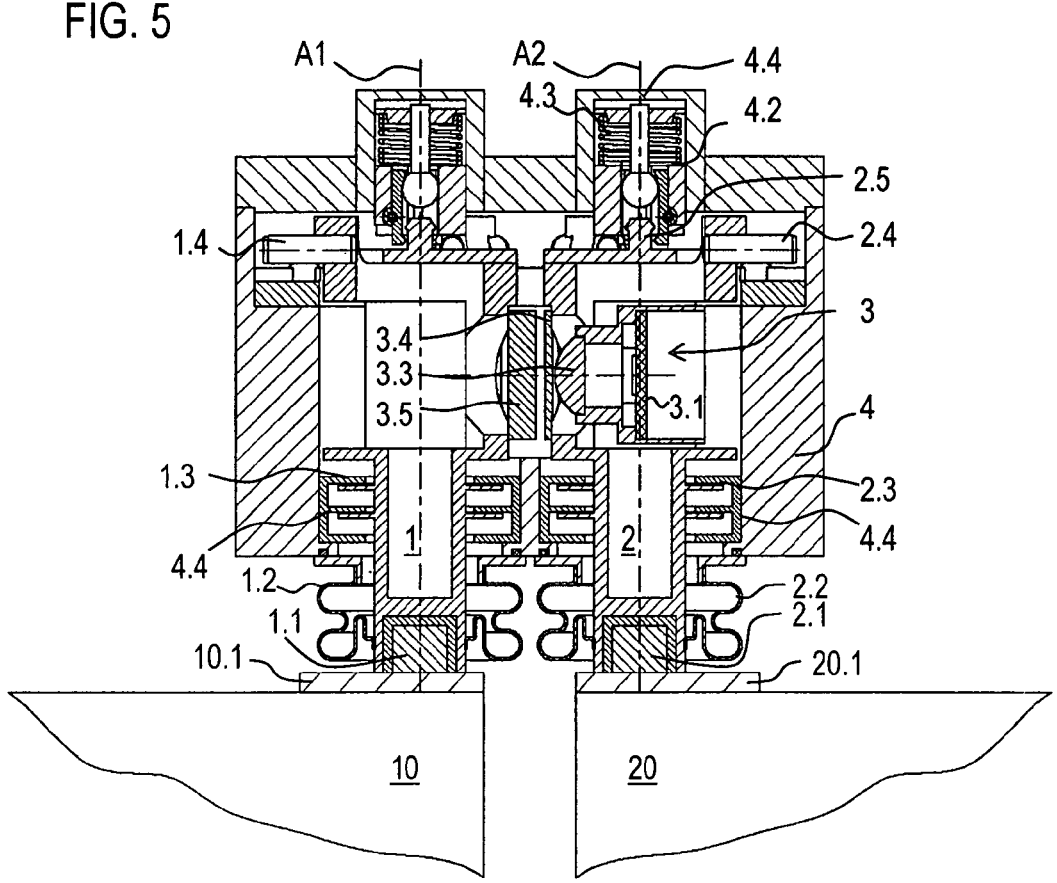
FIG. 5
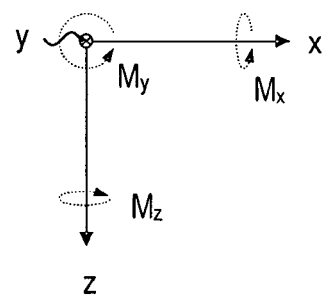

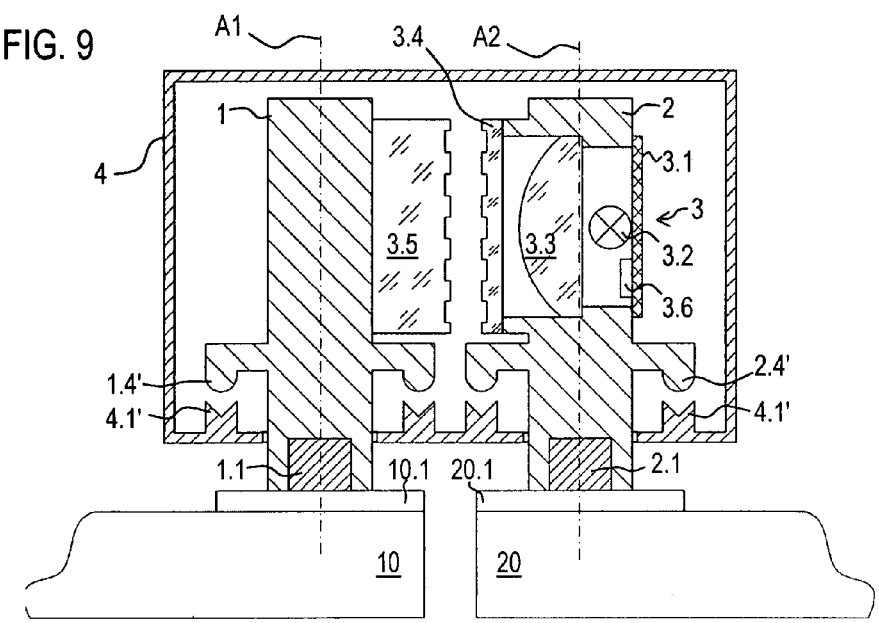
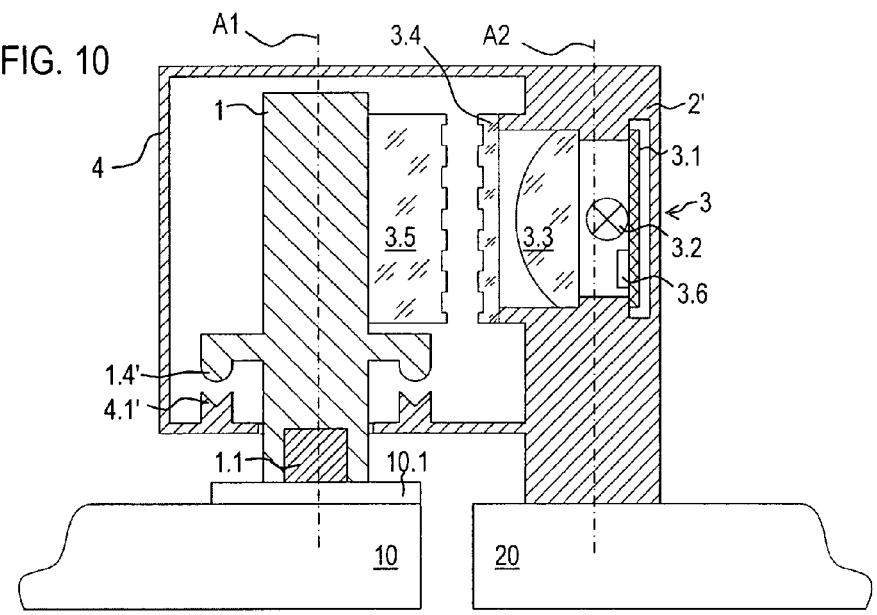

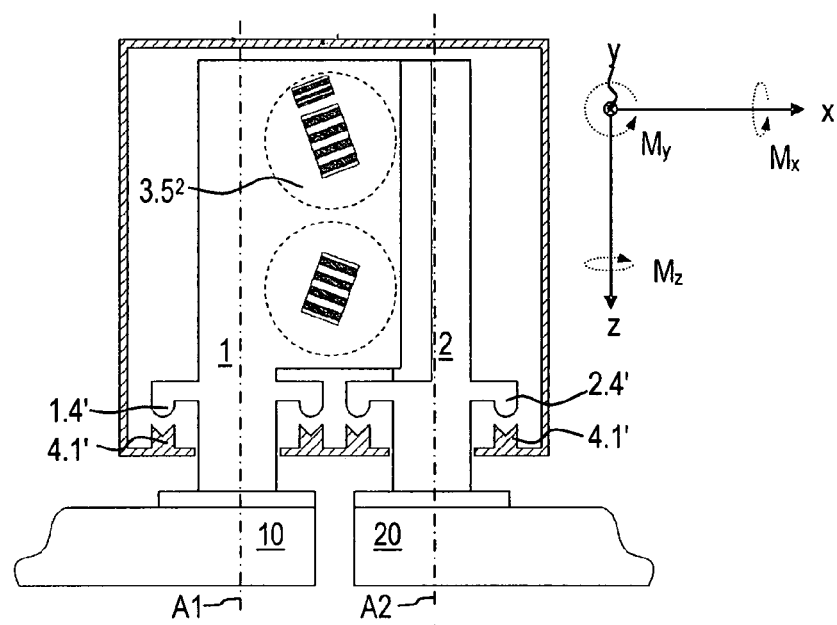
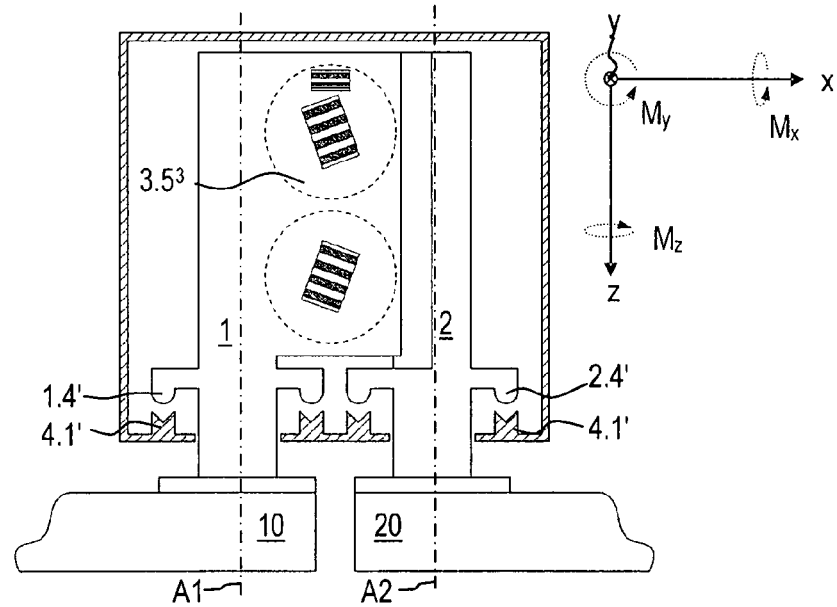

MEASURING DEVICE FOR DETERMINING THE RELATIVE OFFSET BETWEEN TWO COMPONENTS

CROSS-REFERENCE TO RELATED APPLICATIONS

The present application claims priority to Application No. 10 2006 021 338.6, filed in the Federal Republic of Germany on May 5, 2006, and to Application No. 10 2007 019 592.5, filed in the Federal Republic of Germany on Apr. 24, 2007, each of which is expressly incorporated herein in its entirety by reference thereto.

FIELD OF THE INVENTION

The present invention relates to measuring devices, which are able to be used on mirror segments of telescopes, for example.

BACKGROUND INFORMATION

Instead of a single mirror, telescopes of the newer generation have a plurality—up to a few thousand—of mostly hexagonal mirror segments. Normally, all mirror segments are fixed in place in a densely packed manner in a hexagonal arrangement, so that, with the exception of edge mirror segments, mirror edges of adjacent mirror segments are always positioned parallel to each other at a clearance of approximately 1 mm. If the telescopes are to be able to carry out their imaging tasks, the position of the mirror segments relative to each other must be controlled very precisely. Segmented telescopes often have an extremely large overall surface and are typically installed out in the open.

PCT International Published Patent Application No. WO 2004/020953 describes a measuring device for determining the relative positions of corresponding mirror segments, which is based on a capacitive operating principle. The sensitive elements are secured to the end faces of the mirror segments. One of the disadvantages of such measuring systems is their relatively low measuring sensitivity, so that they are generally considered unsuitable for applications requiring high measuring accuracy. Furthermore, the measurement is influenced considerably by fluctuations in the air humidity and by small condensation droplets. In addition, these systems provide different signal amplitudes as a function of the particular clearance or gap between adjacent mirror segments. Furthermore, in conventional measuring systems, the sensors must be disposed within the small gap between the mirror segments, which is possible only if the gaps have a correspondingly large size. This has a considerable detrimental effect on the optical transfer function and the quality of the telescope.

European Patent No. 1 379 832 describes a measuring probe, which has a pin having a point-shaped probe geometry, the pin being guided inside the housing of the measuring probe. Such measuring probes may also be operated side-by-side. However, systems of this type cannot offer the accuracy that is required, for example, in measuring the relative offset of adjacent mirror segments in telescopes.

SUMMARY

Example embodiments of the present invention provide a measuring device, which allows an extremely precise determination of the relative offset between two components.

According to an example embodiment of the present invention, the measuring device for determining the relative offset between two components in a z-direction includes a first measuring member, which is affixable on a first component, a second measuring member, which is affixable on a second component, and a sensor device for determining the relative position of the two measuring members. The first measuring member and the second measuring member are affixable on, respectively, the first and second component such that movements having a directional component parallel to the z-direction are able to be transmitted from one of the components to the measuring member affixed thereon. The first measuring member and the second measuring member are arranged such that the first measuring member is affixable on the first component at a rigid angle, and the second measuring member is affixable on the second component at a rigid angle. At least one of the measuring members is arranged to be able to be brought into adhesive contact with the first component or the second component. Furthermore, the measuring device has support, or seat, members for at least one measuring member. The measuring device is configured such that the at least one measuring member is optionally able to assume a parking or an operating position. The configuration of the support members provides that the measuring members may be precisely and reproducibly aligned in space relative to each other in the parking position. Mirror segments of a telescope are examples of components to be measured.

Each measuring member may have a longitudinal axis, the longitudinal axis of the first measuring member and the longitudinal axis of the second measuring member having a shared directional component in the z-direction, and the two measuring members are displaceable relative to each other along their longitudinal axes. That is, the longitudinal axes of the two measuring members may be aligned linearly dependently with respect to each other. For example, it may be provided that the longitudinal axes of the measuring members are disposed parallel to each other. The measuring members may be designed in the form of pins or sleeves.

At a rigid angle in this context means that the particular affixation is implemented such that reaction moments are able to be produced at the affixation point by the application of external forces on the particular measuring member perpendicular to its longitudinal axis.

The affixation of the measuring members on the components may be implemented such that reaction forces in all spatial directions as well as reaction moments about three linearly independent axes are able to be generated through the application of external forces on the particular measuring member. Thus, the support may be arranged in accordance with a six-degree-of-freedom (6DoF) arresting support. Such a mounting is similar to a mechanically-fixed clamping model. In other words, the first measuring member and the second measuring member may be arranged to be affixable on, respectively, the first component and the second component such that forces in all spatial directions and moments about three linearly independent axes, i.e., three axes that have an orthogonal alignment relative to each other, are able to be transmitted via the affixation. Due to this type of affixation, no relative movement between the measuring members and the components to be measured is possible, and no angular movement either, as is possible, for example, in conventional probes having ball tips (rolling movement). This is a considerable significance in achieving the high measuring precision of the measuring device. Even with contact surfaces that have an exceedingly level structure, every sliding and rolling movement causes unacceptable measuring errors.

For the affixation at a rigid angle, the contact surface between the particular measuring member and the component affixed thereto is relatively large. The contact surfaces may be shaped in accordance with different specifications, for example, as level or hollow (concave) surfaces. However, it is also possible to provide an edge support only or a multi-point support, such as a three-point support, for example.

The first measuring member and/or the second measuring member may be configured to be able to be brought into adhesive contact with, respectively, the first component and the second component. To this end, a permanent magnet may be provided on one measuring member, which may cooperate with, for example, an additional permanent magnet on the other component, or with a ferromagnetic element on the other component, such that an adhesive connection between the measuring member and the component results. Instead of permanent magnets, it is also possible to use switchable electromagnets. Furthermore, it is also possible to provide vacuum holders on the particular components, for example, in cavities at the ends of the measuring members to secure the measuring members. In this arrangement, the opposite surface on the corresponding component should have appropriate evenness. The arrangement may also be reversed, so that the vacuum holder is alternatively provided on the component. However, as an alternative thereto, it is also possible to secure the measuring members to the individual components via so-called electrostatic clamping. Bipolar electrostatic clamping, in which the electrical voltage is supplied only via the measuring members, may be used. In the process, one pole may be electrically connected to the first measuring member, and the other pole be electrically connected to the second measuring member.

The first measuring member and/or the second measuring member may be arranged to allow the adhesive contact to be released by a movement of the first and/or second component in the z-direction. This movement direction may have an axial orientation with respect to the particular measuring member. For example, the adhesive contact may be released by a movement of the first or second component that is axial with respect to the particular measuring member.

The measuring device may be arranged such that the measuring members have no static redundancy in the measuring operation. For this reason, the measuring device is configured so as to leave at least one measuring member unguided within the measuring device in measuring operation. This means that, within permissible movement tolerances, practically no forces and/or moments are transmitted from one component of the measuring device to the measuring members during measuring operation. The guidance of the component to be measured is thus used as guidance of the particular measuring member.

The support members often have two groups of support elements. One group may be assigned to the measuring members, while the other group may be assigned to the housing.

The measuring device may have an optical sensor device, which includes a light source and a photodetector for determining the relative position of the two measuring members and thus also for determining the relative offset of the two components affixed thereto. A separate structured element may be affixed on the first measuring member and on the second measuring member, the structured elements being illuminable by the light source so that the photodetector is able to convert the light beams modulated by the structured elements into electrical signals, which are a function of the relative position of the two measuring members or of the relative offset between the two components. However, sensor devices that are based on a magnetic, inductive or capacitive principle, etc., may be used as an alternative.

The measuring device may include a housing that at least partially surrounds both the first measuring member and the second measuring member, and also the sensor device. The housing may be electrically conductive, so that it has a shielding effect with respect to electromagnetic radiation. A housing made of metal, sheet metal or plastics coated by metal, etc., may be used. Particularly in instances where the measuring device is used in a telescope, it may be provided that the housing is light-proof, especially when an optical sensor device is utilized.

The measuring device may include a sensor element, which emits a signal as soon as at least one measuring member has assumed its parking position. Such a sensor element may be configured as a light barrier or photo element, or as a Hall-effect sensor, etc.

The two components whose mutual offset is to be measured do not necessarily have to be arranged in one plane. For example, the measuring device may also be configured such that, e.g., the two components are disposed at sides of the measuring device that are opposite from one another. For example, the individual ends of the measuring members that are configured for the affixation on the individual component may point in opposite directions.

The measuring device may be configured to allow the electrical signals for determining the relative position of the two measuring members to be used both in the z-direction and in an additional x-direction, which is orthogonal to the z-direction. For example, at least one structured element may have two regions, the grating structures in at least one region being inclined relative to the z-direction. Such a measuring device is able to eliminate measuring errors caused by movements along a direction transverse to the z-direction, or it is able to compensate for possible faulty measurements caused by relative movements of the components in a direction that is orthogonal to the z-direction.

The grating structures may be oriented so as to have a component in the z-direction. All grating structures may be disposed on one and the same substrate and may be located within one plane.

As an alternative, the grating structures may also be disposed in one or a plurality of geometrical planes situated in space to be oblique relative to the z-direction. It may be provided that each of these measuring devices is equipped with two sensor devices.

The structured elements may have two regions where the grating structures have a complementary orientation. In the following text, a complementary orientation should be understood to mean that the grating structures are inclined both at a positive and a negative angle with respect to the z-direction. For example, the two region may be disposed symmetrically with respect to each other, e.g., the positive and negative angles may have the same amount with respect to the z-direction.

The measuring device may have two sensor devices for determining the relative position of the two measuring members in the z-direction and for correcting the relative position with regard to a variable offset of the two measuring members that is orthogonal to the z-direction.

Both sensor devices may have a reference mark, so that a measuring device is provided which constitutes an absolute, two-dimensional measuring system. The reference mark may be arranged as an extension of the measuring graduation, i.e., orthogonal to the grating structure or the grating lines, adjacent to the grating structure for the incremental path measurement. The inclination relative to the z-direction of the grating structure of the reference mask may be identical to the inclination of the grating structure for the incremental path measurement. This makes it possible to produce a bidirectionally stable reference mark.

The measuring device for determining the relative offset between two components in a z-direction may include a first measuring member, which is affixable on a first component, a second measuring member, which is affixable on a second component, and a sensor device for determining the relative position of the two measuring members. The first measuring member and the second measuring member are affixable on, respectively, the first and second component such that movements having a directional component parallel to the z-direction are able to be transmitted from one of the components to the measuring member affixed thereon. Furthermore, the measuring device has at least one optical sensor device, which includes a light source and a photodetector for determining the relative position of the two measuring members. One structured element in each case is affixed on the first measuring member and on the second measuring member, the structured elements being illuminable by the light source, so that the photodetector is able to convert the light beams, modulated by the structured elements, into electrical signals, which are a function of the relative position of the two measuring members. According to this additional aspect, such a measuring device may be configured such that the electrical signals for determining the relative position of the two measuring members are able to be utilized both in the z-direction and in an additional x-direction, which is orthogonal to the z-direction.

The first measuring member and the second measuring member may be configured to be affixable on, respectively, the first component and the second component. In order to correct the position with regard to an offset of the components orthogonal to the z-direction, the measuring member includes at least one structured element, which has grating structures that are inclined relative to the z-direction.

According to an example embodiment of the present invention, a measuring device for determining a relative offset between two components in a z-direction includes: a first measurement member affixable on a first component at a rigid angle and to transmit movements having a directional component parallel to the z-direction from the first component to the first measurement member; a second measurement member affixable on a second component at a rigid angle and to transmit movements having a directional component parallel to the z-direction from the second component to the second measurement member; a sensor device adapted to determine a relative position of the measurement members; and support members for at least one measurement member, the at least one measurement member configured to assume a parking position and an operation position. At least one of the measurement members is configured to adhesively contact the respective component. In the parking position, the measurement members are precisely and reproducibly aligned in space with respect to each other in accordance with the configuration of the support members.

In the operation position, the at least one measurement member may be unguided inside the measuring device during a measurement operation.

The first measurement member may be affixable on the first component and the second measurement member may be affixable on the second component so that forces in all spatial directions and moments about three axes orthogonally aligned relative to one another are transmittable by the affixation.

The first measurement member and the second measurement member may be configured to adhesively contact the respective component.

The adhesive contact may be releasable by movement of the component in a direction having a directional component parallel to the z-direction.

At least one of the measurement members may include a magnet for the adhesive affixation.

The measuring device may include a housing at least partially surrounding the first measurement member and the second measurement member.

The sensor may be arranged as an optical sensor device including a light source and a photodetector.

An individual structured element may be affixed on each of the first measurement member and the second measurement member, the structured elements may be illuminable by the light source, and the photodetector may be configured to convert light beams modulated by the structured elements into electrical signals as a function of the relative position of the measurement members.

The relative position of the measurement members in the z-direction and in a direction orthogonal to the z-direction may be determinable in accordance with the electrical signals.

At least one structured element may include two regions, and a grating structure in at least one region may be inclined relative to the z-direction.

The grating structures may be oriented to include a component in the z-direction.

The grating structures may be arranged in a geometrical plane obliquely positioned in space relative to the z-direction.

The at least one structured element may include two regions, and the grating structures in the two regions may have a complementary orientation.

The grating structures in the two regions may be symmetrically arranged with respect to each other.

The measuring device may include two sensor devices for correction of the relative position of the measurement members with regard to an offset orthogonal with respect to the z-direction.

The measuring device may include a light-proof housing.

The measuring device may include a sensor element configured to signal assumption of the parking position.

According to an example embodiment of the present invention, a measuring device for determining the relative offset between two components in a z-direction includes: a first measurement member affixable on a first component at a rigid angle and to transmit movements having a directional component parallel to the z-direction from the first component to the first measurement member; a second measurement member affixable on a second component at a rigid angle and to transmit movements having a directional component parallel to the z-direction from the second component to the second measurement member; and an optical sensor device, including a light source and a photodetector, configured to determine the relative position of the measurement members. An individual structured element is affixed on each of the first measurement member and the second measurement member, the light source configured to illuminate the structured elements, and the photodetector configured to convert light beams modulated by the structured elements into electrical signals as a function of the relative position of the measurement members. The relative position of the measurement members in the z-direction and in a direction orthogonal to the z-direction is determinable in accordance with the electrical signals.

The at least one structured element may include grating structures inclined relative to the z-direction for correction of the relative position with respect to an offset orthogonal to the z-direction.

The grating structures may be oriented to have a component in the z-direction.

The grating structures may be located in a geometrical plane obliquely positioned in space relative to the z-direction.

The structured elements may include two regions, and grating structures may be complementarily inclined in the two regions.

The measuring device may include two sensor devices for correcting of the relative position of the measurement members with respect to an offset orthogonal to the z-direction.

The first measurement member may be affixable on the first component at a rigid angle, and the second measurement member may be affixable on the second component at a rigid angle.

Additional features and aspects of example embodiments of the present invention are described in more detail below with reference to the appended Figures.

BRIEF DESCRIPTION OF THE DRAWINGS

FIG. 5 is a longitudinal cross-sectional view through the measuring device in an operating position.

FIG. 9 is a cross-sectional view of a measuring device in an operating position, according to an example embodiment of the present invention.

FIG. 10 is a cross-sectional view of a measuring device in an operating position, according to an example embodiment of the present invention.

FIG. 11b is a cross-sectional view of the measuring device illustrated in FIG. 11a.

FIG. 12 is a cross-sectional view of a measuring device in an operating position, according to an example embodiment of the present invention.

FIG. 13 is a cross-sectional view of a measuring device in an operating position, according to an example embodiment of the present invention.

DETAILED DESCRIPTION

A measuring device, according to example embodiments of the present invention, may be used to determine the relative offset between two adjacent mirror segments 10, 20 of a telescope, based on a fixed system, in this instance on a support structure of mirror elements 10, 20. The offset measurement of the components to be measured in such a telescope, which are mirror segments 10, 20 in the example embodiments, requires a resolution and an accuracy in the nanometer range. According to example embodiments, the offset of adjacent hexagonal mirror segments 10, 20 perpendicular to the mirror surface, i.e., in the z-direction (see, e.g., FIG. 5), is measured.

Figure 1:
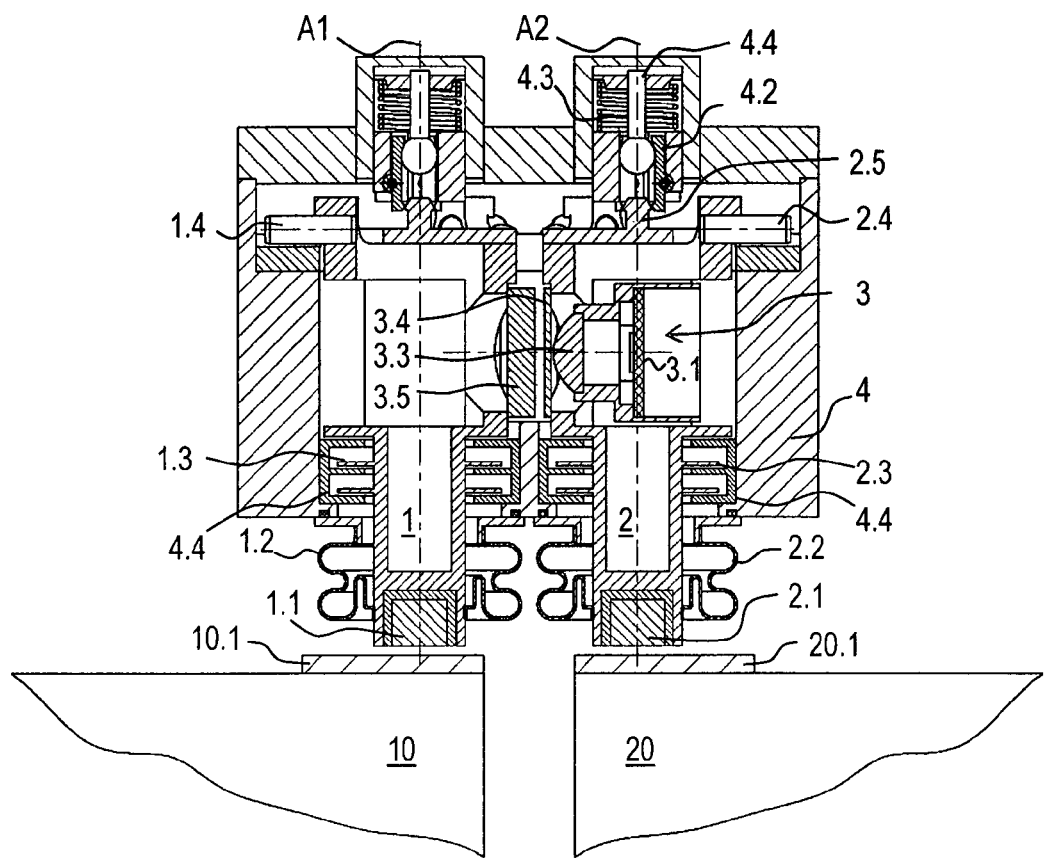
FIG. 1 is a longitudinal cross-sectional view through a measuring device in a parking position, according to an example embodiment of the present invention.

FIG. 1 is a cross-sectional view of the measuring device for determining the relative offset between first mirror segment 10 and second mirror segment 20. The measuring device illustrated in FIG. 1 is in a parking position, in which the measuring device is decoupled from mirror segments 10, 20. As described below, the measuring device may optionally assume a parking or an operating position. Every mirror segment 10, 20 has a ferromagnetic plate 10.1, 20.1, which is affixed on particular mirror element 10, 20 so as to be non-displaceable.

The measuring device includes two measuring members in the form of pins 1, 2, which have longitudinal axes A1, A2 and are disposed parallel to each other in a housing 4. Housing 4 is an electrically conductive housing in this example in order to provide satisfactory electrical shielding. Pins 1, 2 are made of an identical material and have a substantially similar construction with regard to their contours, so that environmental influences, such as the ambient temperature or its change, does not result in measuring errors.

Figure 2:
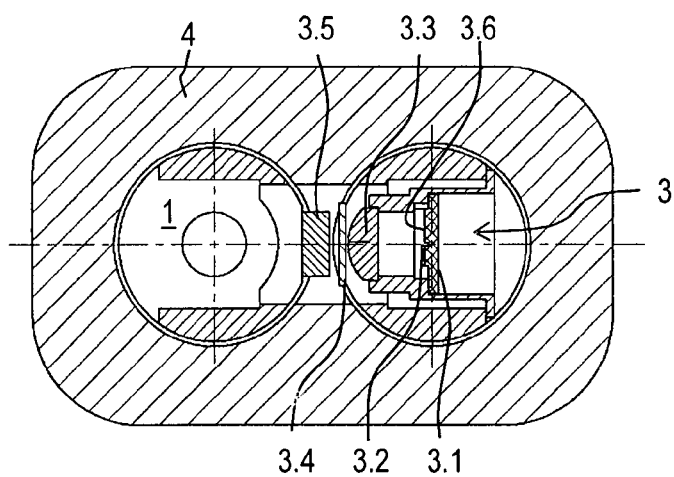
FIG. 2 is first cross-sectional view of the measuring device.
Figure 3:
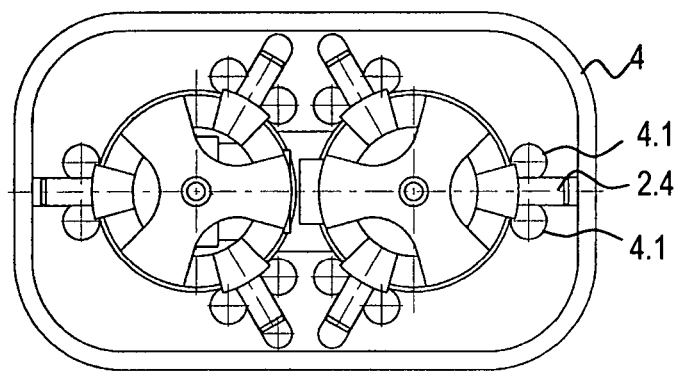
FIG. 3 is another cross-sectional view of the measuring device.

Furthermore, a sensor device 3 is accommodated in housing 4, whose components are connected to first pin 1 and/or second pin 2. In the exemplary embodiment illustrated, a sensor device 3 which operates according to an optical principle is provided. Affixed on first pin 1 is a printed circuit board 3.1 on which, e.g., a light source 3.2, in the form of an LED, and a photodetector 3.6 (see, e.g., FIG. 2), in the form of a photo element, are mounted. Furthermore, a collimation lens 3.3 and a structured element arranged as a probing plate 3.4 are affixed on first pin 1.

Printed circuit board 3.1 has a flexible-conductor connection to housing 4, which is used, e.g., for the electrical supply of light source 3.2 and for signal transmission from photodetector 3.6. As an alternative, twisted, enamel-insulated wires also may be used at this location. Such an electrical connection of printed circuit board 3.1 to housing 4 may result in a very low power input into pin 1.

Disposed opposite to these components is a measuring graduation 3.5 on second pin 2. Measuring graduation 3.5 is a structured element on which an extremely fine scale is applied. Measuring graduation 3.5, or the scale, may have a graduation period of, e.g., 8 μm. Since this is a reflective light system, the scale is on the surface of measuring graduation 3.5 facing probing plate 3.4. The optical axis in this exemplary embodiment is aligned orthogonally with respect to longitudinal axes A1, A2 of pins 1, 2. The neutral point of rotation of sensor device 3 in the example embodiment illustrated is located virtually in the plane of the scale, approximately in the middle between pins 1, 2. This arrangement is significant, particularly in those cases where the components to be measured, e.g., mirror segments 10, 20, experience angular movements, so that the actual measuring location becomes relevant. A measuring location disposed symmetrically to pins 1, 2 may be provided.

The measuring device has a housing 4, which partially surrounds first pin 1 and second pin 2 and completely surrounds sensor device 3. This encapsulation of sensor device 3 by housing 4 protects it against environmental influences such as contamination, condensation, electromagnetic interference, etc. Optionally, for protection against environmental influences, a slight overpressure may be generated inside housing 4, e.g., by introducing pressurized air into housing 4.

For use of the measuring device in telescopes, it is particularly significant that sensor device 3 does not emit any light to the outside. To achieve this light-proofness, a diaphragm seal 1.2, 2.2 in the form of expansion bellows is arranged at each pin 1, 2. Diaphragm seals 1.2, 2.2 are configured to exert minimal axial restoring forces on pins 1, 2. Furthermore, annular plates 1.3, 2.3 are provided on each pin 1, 2, which are surrounded by a socket 4.5 in housing 4 in a manner allowing axial displacement. Diaphragm seals 1.2, 2.2 together with annular plates 1.3, 2.3 and sockets 4.5 provide the light-proofness of sensor device 3 with respect to the telescope.

Figure 4:
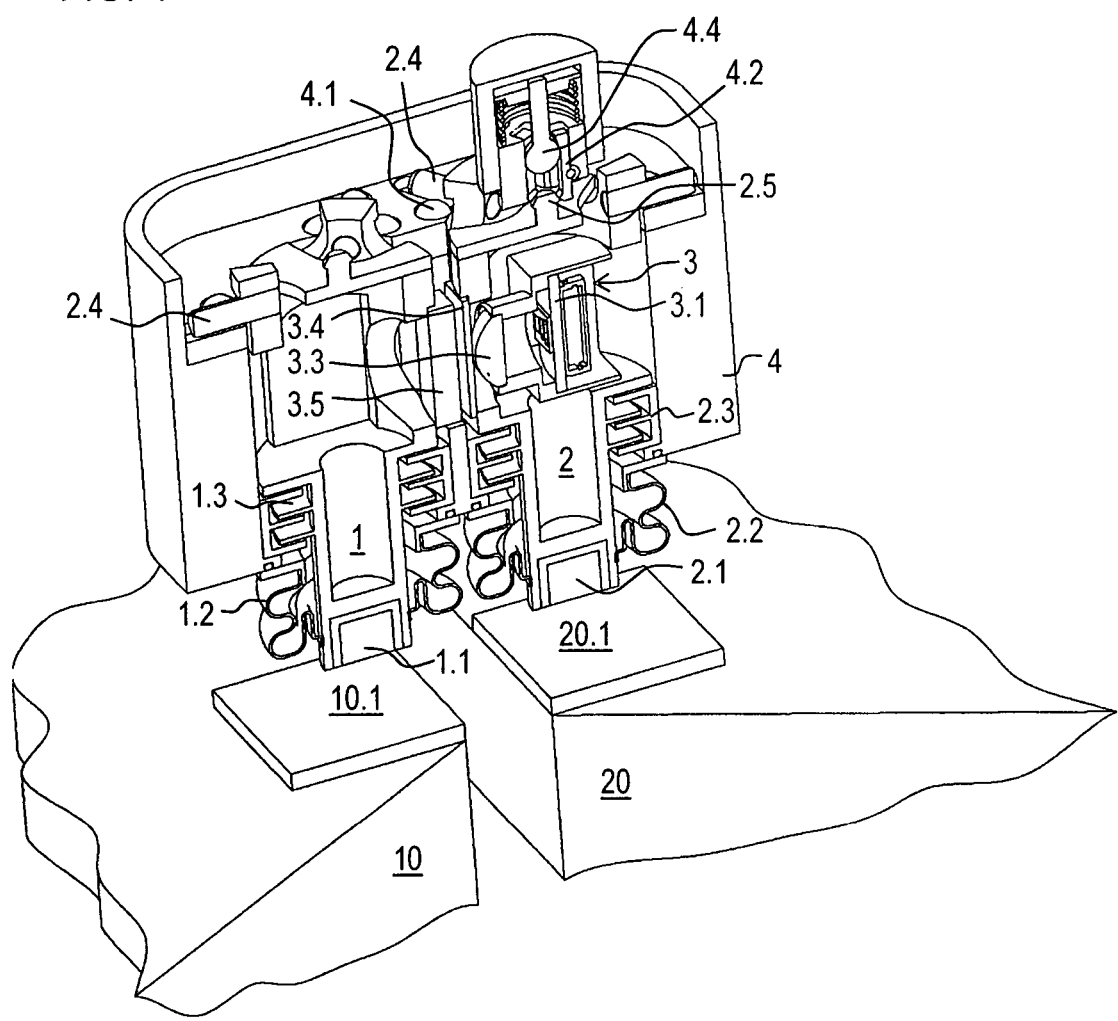
FIG. 4 is a perspective, cross-sectional view of the measuring device in a parking position.

Furthermore, three studs 1.4, 2.4, which are produced with the utmost precision and offset by 120° in each case, are fixed in place on each pin 1, 2. The studs point radially toward the outside in the x-y plane (see, e.g., FIG. 5) relative to the respective longitudinal axis A1, A2 of pins 1, 2 and are used as pin-side support elements. In the so-called parking position illustrated in FIGS. 1 and 4, each stud 1.4, 2.4 is supported between two balls 4.1, balls 4.1 serving as housing-side support elements. Balls 4.1 are also produced exceedingly precisely with regard to their dimensions. The clearance between two immediately adjacent balls 4.1 is smaller than the diameter of studs 1.4, 2.4, so that a precise support member for pins 1, 2 is created. The support members thus have two groups of support elements, i.e., studs 1.4, 2.4, and balls 4.1. Studs 1.4, 2.4 may be assigned to pins 1, 2, while balls 4.1 may be assigned to housing 4.

Levers 4.2 are attached to housing 4 so as to be pivotable, each lever having a conical surface. These conical surfaces cooperate with a conical lug 1.5, 2.5 of pins 1, 2, to the effect that, in the parking position, pins 1, 2 are pressed into the support in an axial direction with respect to their longitudinal axes A1, A2. In particular, studs 1.4, 2.4 of the two pins 1, 2 are pressed into the interspace between balls 4.1. The pressure force is generated by a spring 4.3, which is coupled to a ball stud 4.4, one ball stud 4.4 in each case exerting pressure on one of levers 4.2.

Due to this geometrical arrangement, e.g., due to the arrangement of the support members, it is provided that both pins 1, 2 are precisely and reproducibly aligned in space with respect to each other in the parking position. This applies not only to the relative alignment of pins 1, 2 in their axial direction (z-direction), but also with respect to their rotational position about their longitudinal axes A1, A2. This is so because the arrangement of the support points by balls 4.1 in cooperation with the three studs 1.4, 2.4 disposed at a 120° offset defines the rotational position of pins 1, 2 relative to each other. In addition, the clearance between both pins 1, 2 in the parking position is also fixed by the particular arrangement of the support members. The fixation is adapted to provide a relative alignment of pins 1, 2 that is optimized with regard to the requirements of sensor device 3. Due to the particular arrangement of the support member, which includes balls 4.1, in particular, a quasi self-alignment of pins 1, 2 relative to one another is achieved, and thus a geometrical self-alignment of sensor device 3.

Figure 6:
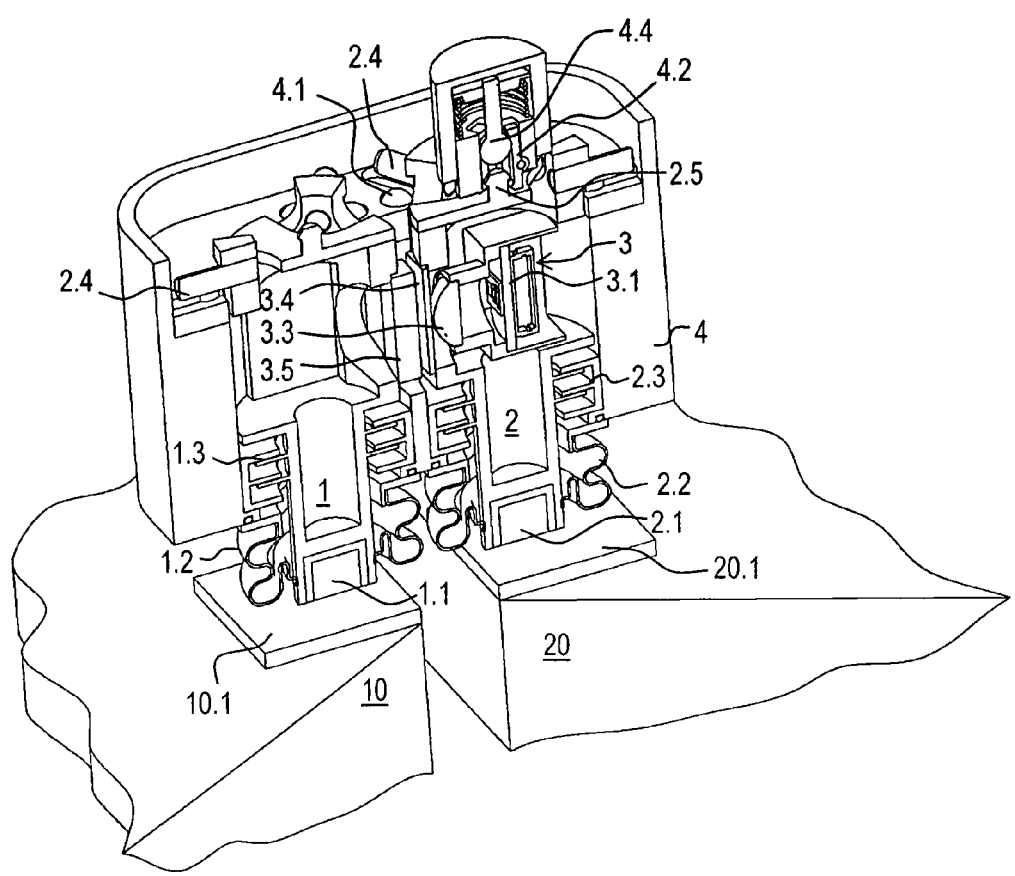
FIG. 6 is a perspective, cross-sectional view of the measuring device in an operating position.

Before the measuring device is put into operation, it must be transferred from the parking position to the operating position. As described above, housing 4 is fixedly joined to the support structure. Mirror segments 10, 20 approach the measuring device opposite to the z-direction, i.e., in the axial direction, relative to longitudinal axes A1, A2 of the two pins 1, 2. Because of magnets 1.1, 1.2, pins 1, 2 adhere to ferromagnetic plates 10.1, 20.1 of mirror segments 10, 20. Mirror segments 10, 20 continue their axial movement and shift pins 1, 2 out of the parking position. Pins 1, 2 are thus free within housing 4 and may be moved with respect to housing 4 in a contactless manner in order to measure the relative position. The measuring device thus makes the transition to an operating position as illustrated in FIGS. 5 and 6.

Pins 1, 2 are arranged such that they are able to be brought into adhesive contact with individual mirror segment 10, 20. Corresponding magnets 1.1, 1.2 have a relatively large planar surface, which adheres to ferromagnetic plates 10.1, 20.1. For this reason, pins 1, 2 are affixed on ferromagnetic plates 10.1, 20.1 or mirror segments 10, 20 in an inflexible manner and at a rigid angle. In measuring operation in the operating position, pins 1, 2 are secured in position at mirror segments 10, 20 such that movements having a directional component parallel to their longitudinal axes A1, A2, or the z-direction, are able to be transmitted from mirror segments 10, 20 to pins 1, 2. Due to the adhering affixation on pins 1, 2, mirror segments 10, 20 or ferromagnetic plates 10.1, 20.1 are able to introduce into pins 1, 2 forces $F_x$, $F_y$, $F_z$ from the x-, y-, and z-direction, as well as moments $M_x$, $M_y$, $M_z$ about axes x, y, z, which are orthogonal with respect to each other. This type of affixation thus corresponds to a six-degree-of-freedom (6DoF) arresting support. Such an affixation provides for an extremely precise determination of the relative offset between mirror segments 10, 20.

To prevent that the overall system is statically redundant, both pins 1, 2 have no guidance within the measuring device or within housing 4 during measuring operation. In other words, pins 1, 2, are without guidance within the measuring device in measuring operation insofar as guidance movements in all directions are initiated only by mirror segments 10, 20 themselves, which are located outside of the measuring device. Due to this type of construction, the measurement itself is independent of the precise position and alignment of housing 4 relative to mirror segments 10, 20, housing 4 being fixed in place on the support structure, as mentioned above.

The position of mirror segments 10, 20 with respect to each other in the z-direction, or along longitudinal axes A1, A2 of pins 1, 2, which are axially displaceable relative to each other in housing 4, must be able to be controlled very precisely during operation of a corresponding telescope. The relative position of mirror segments 10, 20 may be interfered with by the effects of gravitational forces during rotation of the telescope, for example. More specifically, the support structure of mirror segments 10, 20 may be deformed as a result of the application of external forces or internal stresses. These deformations may be relatively serious, since, e.g., in the case of large telescopes, a light and material-saving construction of the support structures should be endeavored, so that the support structures exhibit a relatively flexurally soft behavior. The offset along longitudinal axes A1, A2 between probing plate 3.4 and measuring graduation 3.5 is able to be determined photo-electrically with the aid of optical sensor device 3, the offset corresponding to the offset of the two mirror segments 10, 20. Within certain limits, the position of mirror segments 10, 20 relative to the support structure plays virtually no role in the measurement. The position of the support structure thus does not affect the determination of the offset of mirror segments 10, 20. The measuring signals of the measuring device are forwarded to a control loop, so that mirror segments 10, 20 are always optimally aligned to each other through appropriate control measures, regardless of the position of the telescope or thermal expansions within the support structure or the telescope.

Since housing 4 is affixed on the support structure of mirror segments 10, 20, and the electrical cables for transmitting the measuring signals to subsequent electronics are affixed on housing 4, the movements of pins 1, 2 do not interfere with the measurement. Due to the particular arrangement of the measuring device, e.g., the unguided arrangement and the flexible-conductor connection by which virtually no forces are introduced into second pin 2, the measuring device as a whole exerts practically no force on mirror segments 10, 20, which is advantageous for the precise positioning of mirror segments 10, 20.

In addition to the offset, the two tilted positions outside of the mirror plane are determined from the six measuring values per hexagonal mirror segment 10, 20. This functionality is achieved by determining the relative displacement between measuring graduation 3.5 and probing plate 3.4 via sensor device 3.

Mirror segments 10, 20 are to be recoated at regular intervals. Thus, the de-installation and installation of mirror segments 10, 20 should cause as little work as possible in connection with the installation and adjustment of the measuring device. When mirror segments 10, 20 are de-installed, they are moved away from the measuring device in the direction of longitudinal axes A1, A2 of pins 1, 2 (z-direction). In doing so, pins 1, 2 are pulled into the parking position. A sensor element signals the reaching of the parking position to subsequent electronics. If mirror segments 10, 20 are moved further, magnets 1.1, 2.1 detach from ferromagnetic plates 10.1, 20.1 (see, e.g., FIGS. 1 and 4), and mirror segments 10, 20 are able to be lifted out. No tools are required for this. Pins 1, 2 are thus configured to be self-adherent as well as self-releasing. Furthermore, in the parking position, pins 1, 2 automatically reassume their optimal relative position to each other in a reproducible manner, so that the measuring device may be called self-adjusting. In the parking position, the measuring device is in a state with respect to the components of sensor device 3 that allows a correct transfer into the operating mode or into the operating position, without any special action on the part of an operator.

In order to be able to evaluate the lateral displacement of pins 1, 2 and their angular position following each exchange of mirror segments 10, 20, various signals of sensor device 3 may be taken into account. For example, it is possible to use the amplitude of incremental signals or a reference pulse position relative to the incremental signals for this purpose. It is also possible to use additional sensor signals or signals that result from an electrical contact of a pin 1, 2 with ferromagnetic plate 10.1, 20.1 to this end.

Figure 7:
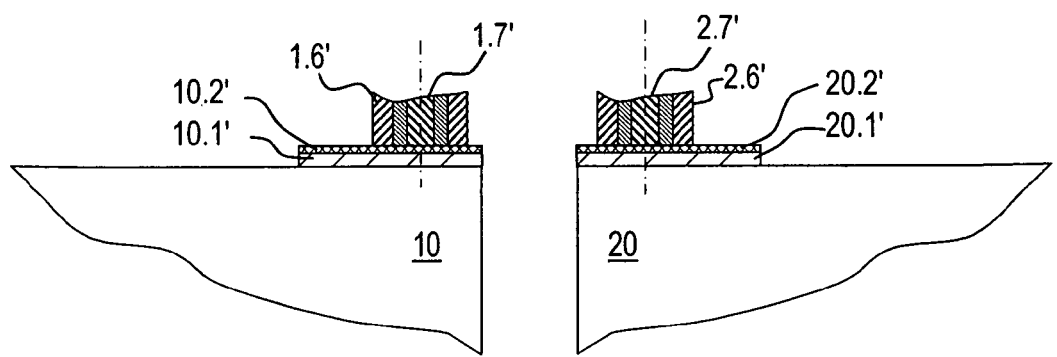
FIG. 7 is a partial cross-sectional view of a measuring device according to an example embodiment of the present invention.
Figure 8:
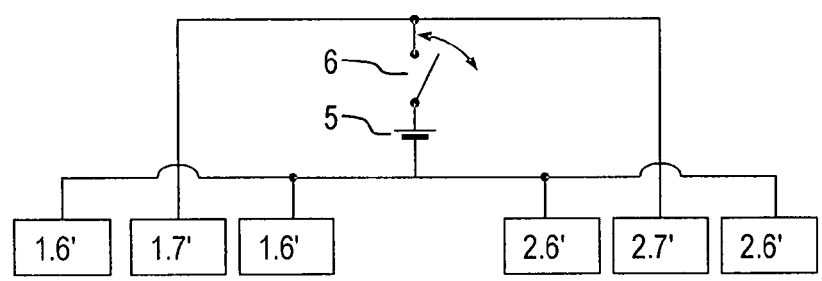
FIG. 8 is a schematic circuit diagram in connection with the measuring device illustrated in FIG. 7.

As an alternative to the affixation of pins 1, 2 by magnets 1.5, 1.6, according to an example embodiment as illustrated in FIGS. 7 and 8, they may also be fixed in place by an electrostatically acting arrangement. In this example embodiment, a ring electrode 1.6', 2.6' (cathode) and a central electrode 1.7', 2.7' (anode) are provided for each pin 1, 2, each ring electrode 1.6', 2.6' being separated from the central electrode 1.7', 2.7' by an insulation layer. Ring electrodes 1.6', 2.6' are connected to a pole of a direct-voltage source, while central electrodes 1.7', 2.7' are in contact with the other pole (see, e.g., FIG. 8).

An electrically conductive layer 10.1', 20.1' on which a dielectric layer 10.2', 20.2' is applied, is fixed in place on mirror segments 10, 20 on the surfaces provided for the affixation. The materials chosen for dielectric layer 10.2', 20.2' may be, for example, $Ta_2O_5$, $Si_3N_4$, quartz, $SrTi_4$, $Y_2O_3$, since these materials have a high relative dielectric constant and high dielectric strength.

As an alternative, when using, for example, Zerodur as the material for mirror segments 10, 20, it is possible to utilize the Johnson Rabbeck effect and to achieve the affixation as counter-electrode on mirror segments 10, 20, without corresponding layers, if the electrode structure is formed of latticed, alternating anodes and cathodes.

Optionally, a voltage may, or may not, be applied to ring electrodes 1.6', 2.6' and central electrodes 1.7', 2.7' with the aid of a switch 6. If the voltage is applied, an adhesive contact is produced between mirror segments 10, 20 and pins 1, 2. Since ring electrodes 1.6', 2.6' enclose a relatively large contact area, an affixation of pins 1, 2 on mirror segments 10, 20 at a rigid angle is made possible. In particular, pins 1, 2 are fixed in place on mirror segments 10, 20 in all degrees of freedom ($F_x$, $F_y$, $F_z$, $M_x$, $M_y$, $M_z$) in this example embodiment.

FIG. 9 illustrates an example embodiment in which the measuring device is in an operating position and two virtually identical pins 1, 2 are used as measuring members. A difference from the previously-described example embodiments is that the support member on the housing side is formed of a v-groove 4.1', and on the pin side of premolded hemispherical members 1.4', 2.4', and that the support member is disposed between sensor device 3 and mirror segments 10, 20 with respect to the z-direction. In the device illustrated in FIG. 9, pins 1, 2 are precisely and reproducibly aligned in space with respect to each other in the parking position. For clarity, FIG. 9 does not show the mechanism for pressing hemispherical members 1.4', 2.4' into respective v-groove 4.1'.

Another example embodiment is illustrated in FIG. 10. The measuring device illustrated in FIG. 10 also includes two measuring members, the first measuring member being arranged as pin 1. Second measuring member 2' is disposed to be non-displaceable with respect to housing 4. In particular, second measuring member 2' is integrated in housing 4. As described above, first pin 1 is affixed on mirror segment 10 at a rigid angle to be adhesive, using magnet 1.1 and ferromagnetic plate 10.1. Second measuring member 2' is affixed at a rigid angle on the other mirror segment 20. In doing so, an adhesive affixation may be implemented, possibly using an additional magnet, or some other type of rigid-angle affixation may be provided. The parking position of first pin 1 in the device illustrated in FIG. 10 is achieved analogously to that illustrated in FIG. 9. Since second measuring member 2' is part of housing 4 in this example, pin 1 is precisely and reproducibly aligned in space with respect to second measuring member 2' in the parking position.

However, it may also happen that the movements of mirror segments 10, 20 do not occur strictly along the z-direction but instead have directional components transversely to the z-direction. Furthermore, it is impossible to avoid an inclination, now matter how minimal, of both pins 1, 2 with respect to one another. For example, mirror segments 10, 20 may move up to, e.g., one millimeter relative to one another in a transverse direction, e.g., in the x-direction. Given an inclined position of first pin 1 relative to second pin 2 of, e.g., approximately 0.1 mrad, such transverse movements would cause a measuring error of 100 nm if no special measures were taken. Measuring errors of this type would make it impossible to operate a segmented telescope mirror.

FIGS. 11a to 15 illustrate measuring devices that are relatively insensitive to transverse movements of mirror segments 10, 20. In particular, transverse movements in the x-direction are of relevance for the particular telescope mirrors. Such transverse movements may be caused by thermal expansions of mirror segments 10, 20, for example, or by gravitational loading of the support structure upon rotation of the mirror telescope. The devices illustrated in FIGS. 11a through 15 have in common that the electrical signals from sensor devices 3 may be used to determine the relative position of the two measuring members both in the z-direction and in the x-direction, which is orthogonal to the z-direction. In particular, the measuring devices include structured elements $3.4^1$, $3.4^2$, $3.4^3$; $3.5^1$ $3.5^2$, $3.5^3$, $3.5^4$, $3.5^5$ having grating structures, the grating structures being inclined at an angle α, −α, and β, −β relative to the z-direction. Probing plates $3.4^1$, $3.4^2$, $3.4^3$ and measuring graduations $3.5^1$, $3.5^2$, $3.5^3$, $3.5^4$, $3.5^5$ should be understood as structured elements. In addition, these measuring devices each have two sensor devices 3 whose measuring directions intentionally deviate from the required measuring direction, e.g., such that the measuring devices of the two sensor devices 3 form different angles with the required measuring direction, i.e., the z-direction. The measuring values of the two sensor devices 3 are offset with the aid of prefactors, in the sense of a vector addition, such that a resulting measuring direction that corresponds to the z-direction is obtained.

Figure 11A:
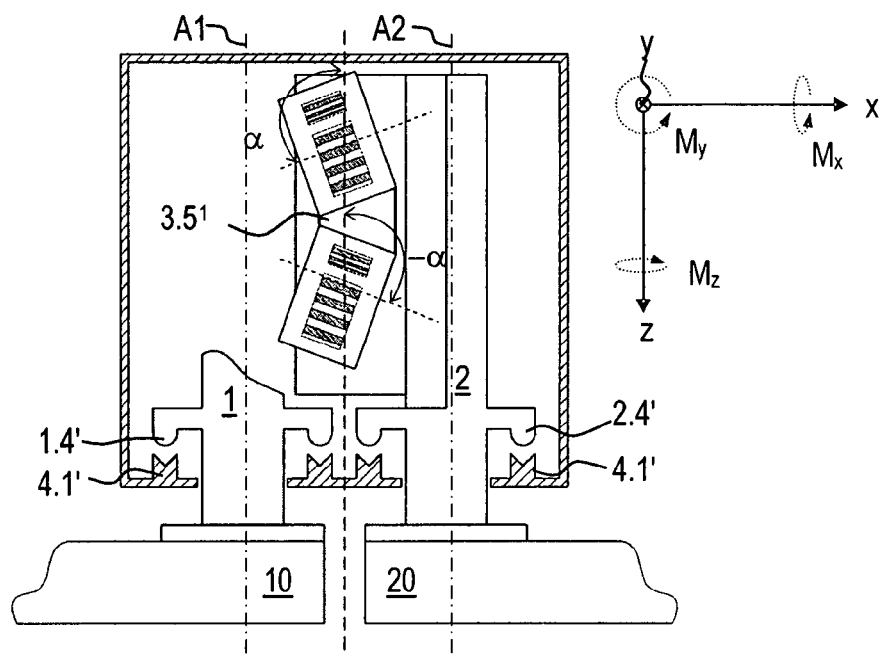
FIG. 11a is a cross-sectional view of a measuring device in an operating position, according to an example embodiment of the present invention.
Figure 11B:
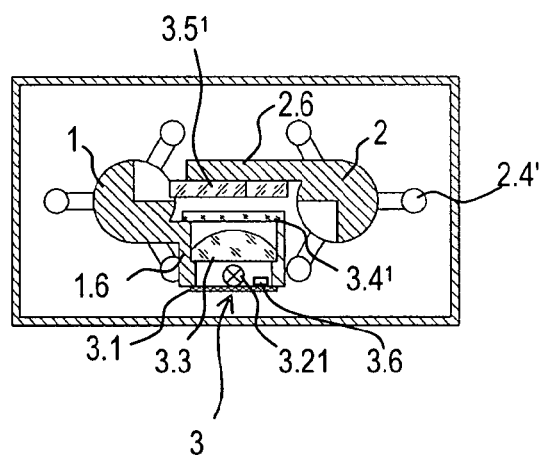

FIGS. 11a and 11b schematically illustrate a measuring device, in which first pin 1 and second pin 2 each have one wing 1.6, 2.6 on which components of sensor devices 3 are mounted.

Two light sources 3.2, which are offset in the z-direction, probing plates $3.4^1$ and photo elements 3.6 are affixed on wing 1.6 of first pin 1. Each probing plate $3.4^1$ in this example embodiment includes grating structures, which are obliquely oriented, so that the grating structures have a component in the z-direction, i.e., are not orthogonally aligned relative to the z-direction.

Affixed on wing 2.6 of second pin 2 is a measuring graduation $3.5^1$, which has obliquely oriented grating structures, these grating structures also being oriented so as to have a component in the z-direction, i.e., are not orthogonally aligned with respect to the z-direction. Both sensor devices 3 substantially correspond to sensor devices 3 of the example embodiments described above.

In the example embodiments shown, the grating structures are arranged as phase gratings or amplitude gratings. In the example embodiment illustrated in FIG. 11a, four individual grating structures are provided on measuring graduation $3.5^1$. The grating structure that is uppermost in FIG. 11a is arranged as a reference mark. The adjacent grating structure lying underneath therefrom is used for the incremental path measurement. The grating structure of the reference mark as well as the grating structure for the incremental path measurement form a first region of grating structures. The grating structures of the first region are inclined at an angle α relative to the z-direction. A second region of grating structures having an additional pair of grating structures is disposed underneath the first region of grating structures. The grating structures of the second region are inclined at an angle −α relative to the z-direction, i.e., have a complementary orientation with respect to each other. Since angles α und −α are equal, e.g., 100 mrad, the grating structures of the two regions are also disposed in symmetry relative to each other.

Arranged across from the grating structures of measuring graduation $3.5^1$ are probing plates $3.4^1$. Probing plates $3.4^1$ have grating structures that correspond to those of measuring graduation $3.5^1$. The grating structures of probing plates $3.4^1$ are arranged in parallel to those of measuring graduation $3.5^1$. Although only one photodetector 3.6 is illustrated in FIG. 11b, the measuring devices illustrated in FIGS. 11a and 11b (and also those illustrated in FIGS. 12 to 15) all have two photodetectors 3.6. During operation of the measuring device, the light from light source 3.2 passes through the adjacent probing plate $3.4^1$, through its grating structures, and then strikes the grating structures of measuring graduation $3.5^1$, which reflects the light in a correspondingly modulated manner. After renewed passage of the light through probing plate $3.4^1$, the two photodetectors 3.6 convert the modulated light into electrical signals. That is, each of the two regions of grating structures of measuring graduation $3.5^1$ is able to be scanned by a photodetector 3.6.

FIG. 12 illustrates an example embodiment, which differs from the example embodiment illustrated in FIGS. 11a and 11b in that the reference mark is omitted in the lower region of grating structures of measuring graduation $3.5^2$, which may be of advantage, e.g., if the available space is limited. For clarity, it should be noted that the probing plates of the corresponding measuring devices are not illustrated in FIGS. 12 and 13. The grating structures provided are those of measuring graduation $3.5^2$, $3.5^3$.

If the relative offset of pins 1, 2 in the z-direction is to be measured absolutely, it may be provided to align the grating structures of the reference mark of measuring graduation $3.5^3$ perpendicular to the z-direction, analogously to the example embodiment illustrated in FIG. 13. At the location (z, x) where the reference mark signal is generated, the position values of both sensor devices 3 are able to be determined and offset against each other, so that an absolute reference value for the z-direction that is approximately independent of the relative position in the x-direction, is able to be produced.

As an alternative to the example embodiments described above, a measuring device may also be provided with a cross grating which has grating structures located one above the other. The grating structures may be oriented at a right angle or at an oblique angle relative to each other. Such cross-grating arrangements are able to be illuminated by a single light source, so that the provision of a single light source may be sufficient when using a cross grating in the measuring device.

Figure 14:
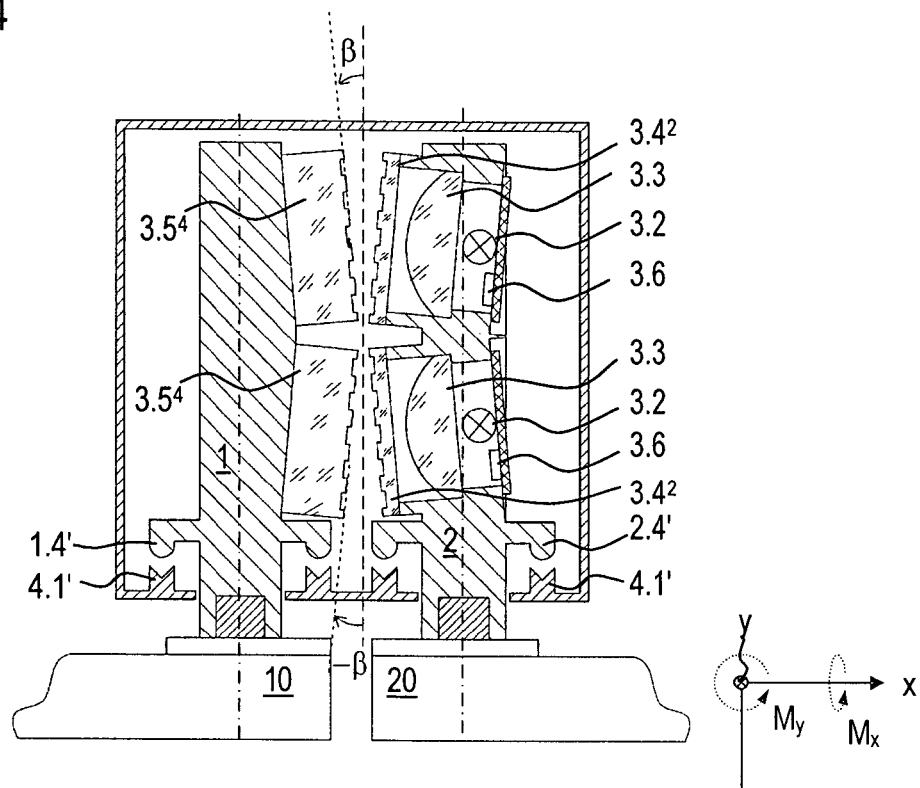
FIG. 14 is a cross-sectional view of a measuring device in an operating position, according to an example embodiment of the present invention.
Figure 15:
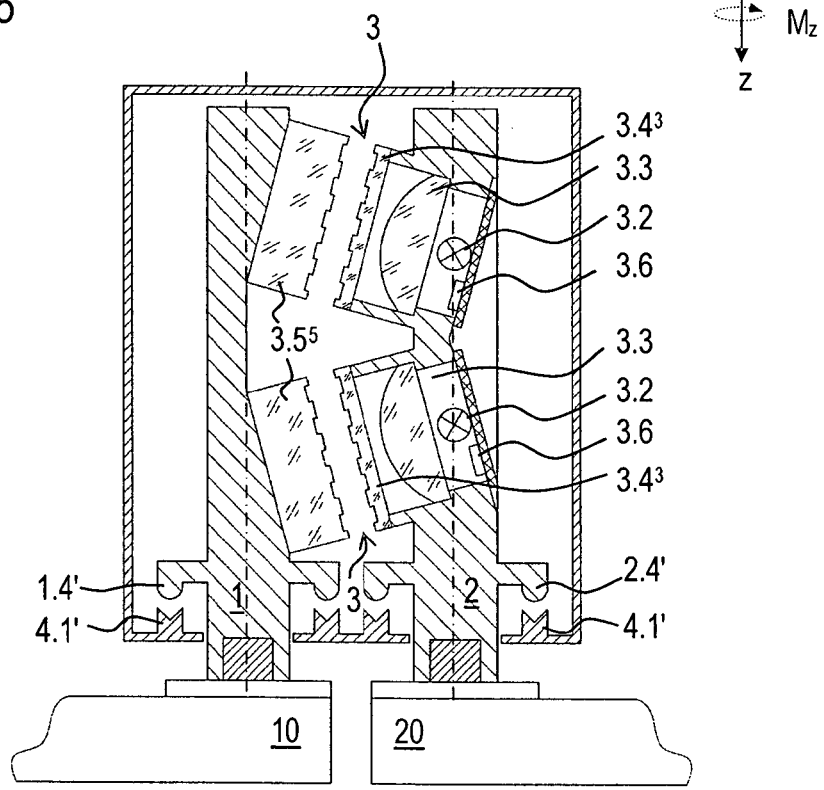
FIG. 15 is a cross-sectional view of a measuring device in an operating position, according to an example embodiment of the present invention.

In the example embodiments illustrated in FIGS. 14 and 15, the structured elements, i.e., measuring graduations $3.5^4$, $3.5^5$ and probing plates $3.4^2$, $3.4^3$, have grating structures that are inclined relative to the z-direction. However, the grating structures are disposed in a geometrical plane (orthogonal to the drawing plane), which is obliquely situated in space relative to the z-direction. As illustrated in FIG. 14, the first region of the grating structures of measuring graduation $3.5^4$ is obliquely positioned with respect to the z-direction, at angle β, whereas the second region is inclined in a symmetrical and complementary manner, at angle −β, with respect to the z-direction. Although measuring graduation $3.5^4$ is illustrated as having two parts in FIG. 14, it may also be produced from a single glass element having surfaces that are slanted correspondingly.

The geometrical analyses of the device illustrated in FIG. 14 may also be applied to the device illustrated in FIG. 15. Measuring graduation $3.5^5$ is in the form of a convex arrangement, a one-part configuration of measuring graduation $3.5^5$ being possible as well. In all other respects, the measuring device illustrated in FIG. 14 has substantially the same features as those of the device illustrated in FIG. 15.

In order to be able to compensate for the transverse movements in the x-direction, the measuring devices illustrated in FIGS. 11a to 15 are first calibrated. To this end, the measuring device is attached to machine components that are able to be moved in a defined manner in the z-direction. Using a reference system, such as a laser interferometer, a wave front sensor, etc., an actual relative displacement in the z-direction is measured. On the basis of the determined position values of the reference system and the two sensor devices 3, it is possible to calculate the correction coefficients that form the basis for a calibration of the measuring device. In an actual measuring operation, it is possible for the measuring device to provide exact measured values for the z-direction, whereas, by the corrective measures, movements in the x-direction do not adversely affect the measuring result. Furthermore, a corresponding measuring device may also be used such that the relative offset of pins 1, 2 in the x-direction is output as a second position value. The operator of the telescope, for example, may use the offset in the x-direction for further analyses.

For purposes of clarity and illustration, a few details that are provided in FIGS. 1 to 6 are omitted in the FIGS. 9 and 15. A combination of features of the various example embodiments described above are possible. Even if no measures are illustrated in, e.g., FIGS. 9 and 15 to prevent the leakage of light, for example, such measures may be provided in these or other example embodiments. The same applies, among others, to the flexible-conductor lines, the press-on device having spring 4.3, etc.

What is claimed is:

1. A measuring device for determining a relative offset between two components in a z-direction, comprising:
    a first measurement member affixable on a first component at a rigid angle and to transmit movements of the first component, having a directional component parallel to the z-direction, from the first component to the first measurement member;
    a second measurement member affixable on a second component at a rigid angle and to transmit movements of the second component, having a directional component parallel to the z-direction, from the second component to the second measurement member;
    a sensor device adapted to determine a relative position of the measurement members; and
    support members for at least one measurement member, the at least one measurement member configured to assume a parking position and an operation position;
    wherein at least one of: (a) the first measurement member is configured to adhesively and releasably contact the first component; and (b) the second measurement member is configured to adhesively and releasably contact the second component; and
    wherein, in the parking position, the measurement members are reproducibly aligned in space with respect to each other in accordance with the configuration of the support members;
    wherein, in the parking position, at least one of: (a) the first measurement member is unaffixed to the first component; and (b) the second measurement member is unaffixed to the second component; and
    wherein, in the operation position, the first measurement member is immovably affixed to the first component and the second measurement member is immovably affixed to the second component.

2. The measuring device according to claim 1, wherein, in the operation position, the at least one measurement member is unguided inside the measuring device during a measurement operation.

3. The measuring device according to claim 1, wherein the first measurement member is affixable on the first component and the second measurement member is affixable on the second component so that forces in all spatial directions and moments about three axes orthogonally aligned relative to one another are transmittable by the affixation.

4. The measuring device according to claim 1, wherein the first measurement member and the second measurement member are configured to adhesively contact the respective component.

5. The measuring device according to claim 4, wherein the adhesive contact is releasable by movement of the component in a direction having a directional component parallel to the z-direction.

6. The measuring device according to claim 4, wherein at least one of the measurement members includes a magnet for the adhesive affixation.

7. The measuring device according to claim 1, further comprising a housing at least partially surrounding the first measurement member and the second measurement member.

8. The measuring device according to claim 1, wherein the sensor is arranged as an optical sensor device including a light source and a photodetector.

9. The measuring device according to claim 8, wherein an individual structured element is affixed on each of the first measurement member and the second measurement member, the structured elements illuminable by the light source, the photodetector configured to convert light beams modulated by the structured elements into electrical signals as a function of the relative position of the measurement members.

10. The measuring device according to claim 9, wherein the relative position of the measurement members in the z-direction and in a direction orthogonal to the z-direction is determinable in accordance with the electrical signals.

11. A measuring device for determining a relative offset between two components in a z-direction, comprising:
    a first measurement member affixable on a first component at a rigid angle and to transmit movements of the first component, having a directional component parallel to the z-direction, from the first component to the first measurement member;
    a second measurement member affixable on a second component at a rigid angle and to transmit movements of the second component, having a directional component parallel to the z-direction, from the second component to the second measurement member;
    a sensor device adapted to determine a relative position of the measurement members; and
    support members for at least one measurement member, the at least one measurement member configured to assume a parking position and an operation position;
    wherein at least one of: (a) the first measurement member is configured to adhesively and releasably contact the first component; and (b) the second measurement member is configured to adhesively and releasably contact the second component;
    wherein, in the parking position, the measurement members are reproducibly aligned in space with respect to each other in accordance with the configuration of the support members;
    wherein, in the parking position, at least one of: (a) the first measurement member is unaffixed to the first component; and (b) the second measurement member is unaffixed to the second component;
    wherein, in the operation position, the first measurement member is affixed to the first component and the second measurement member is affixed to the second component;
    wherein the sensor is arranged as an optical sensor device including a light source and a photodetector;
    wherein an individual structured element is affixed on each of the first measurement member and the second measurement member, the structured elements illuminable by the light source, the photodetector configured to convert light beams modulated by the structured elements into electrical signals as a function of the relative position of the measurement members; and wherein at least one structured element includes two regions, each region including a grating structure, and wherein the grating structure in at least one region is inclined relative to the z-direction.

12. The measuring device according to claim 11, wherein the grating structures are oriented to include a component in the z-direction.

13. The measuring device according to claim 11, wherein the grating structures are arranged in a geometrical plane obliquely positioned in space relative to the z-direction.

14. The measuring device according to claim 11, wherein the at least one structured element includes two regions, and wherein a grating structure is provided in each of the two regions, the grating structure in each of the two regions having a complementary orientation.

15. The measuring device according to claim 14, wherein the grating structure in each of the two regions is symmetrically arranged with respect to each other.

16. The measuring device according to claim 9, wherein the measuring device includes two sensor devices for correction of the relative position of the measurement members with regard to an offset orthogonal with respect to the z-direction.

17. The measuring device according to claim 8, further comprising a light-proof housing.

18. The measuring device according to claim 1, further comprising a sensor element configured to signal assumption of the parking position.

19. A measuring device for determining the relative offset between two components in a z-direction, comprising:
  a first measurement member affixable on a first component at a rigid angle and to transmit movements of the first component, having a directional component parallel to the z-direction, from the first component to the first measurement member;
  a second measurement member affixable on a second component at a rigid angle and to transmit movements of the second component, having a directional component parallel to the z-direction, from the second component to the second measurement member; and
  an optical sensor device, including a light source and a photodetector, configured to determine the relative position of the measurement members;
  wherein an individual grating structure element is affixed on each of the first measurement member and the second measurement member, the light source configured to illuminate the grating structure elements, the grating structure elements configured to modulate light beams from the light source, the photodetector configured to convert the light beams modulated by the grating structure elements into electrical signals as a function of the relative position of the measurement members;
  wherein the relative position of the measurement members in the z-direction and in a direction orthogonal to the z-direction is determinable in accordance with the electrical signals;
  wherein each of the first and second measurement members is configured to assume a parking position and an operation position; and
  wherein, in the operation position, the first measurement member is immovably affixed to the first component and the second measurement member is immovably affixed to the second component.

20. A measuring device for determining the relative offset between two components in a z-direction, comprising:
  a first measurement member affixable on a first component at a rigid angle and to transmit movements of the first component, having a directional component parallel to the z-direction, from the first component to the first measurement member;
  a second measurement member affixable on a second component at a rigid angle and to transmit movements of the second component, having a directional component parallel to the z-direction, from the second component to the second measurement member; and
  an optical sensor device, including a light source and a photodetector, configured to determine the relative position of the measurement members;
  wherein an individual grating structure element is affixed on each of the first measurement member and the second measurement member, the light source configured to illuminate the grating structure elements, the grating structure elements configured to modulate light beams from the light source, the photodetector configured to convert the light beams modulated by the grating structure elements into electrical signals as a function of the relative position of the measurement members;
  wherein the relative position of the measurement members in the z-direction and in a direction orthogonal to the z-direction is determinable in accordance with the electrical signals; and
  wherein each structured element includes a grating structure inclined relative to the z-direction for correction of the relative position with respect to an offset orthogonal to the z-direction.

21. The measuring device according to claim 20, wherein the grating structures are oriented to have a component in the z-direction.

22. The measuring device according to claim 20, wherein the grating structures are located in a geometrical plane obliquely positioned in space relative to the z-direction.

23. The measuring device according to claim 19, wherein the grating structure elements include two regions, and wherein grating structures are complementarily inclined in the two regions.

24. The measuring device according to claim 19, wherein the measuring device includes two sensor devices for correcting of the relative position of the measurement members with respect to an offset orthogonal to the z-direction.

25. The measuring device according to claim 1, wherein the first measurement member is affixable on the first component at the rigid angle without relative angular movability, and the second measurement member is affixable on the second component at the rigid angle without relative angular movability.

26. The measuring device according to claim 19, wherein the first measurement member is affixable on the first component at the rigid angle without relative angular movability, and the second measurement member is affixable on the second component at the rigid angle without relative angular movability.

* * * * *